UNITED STATES PATENT OFFICE.

CARL BOSCH AND ALWIN MITTASCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PRODUCING AMMONIA.

1,089,185.  Specification of Letters Patent.  Patented Mar. 3, 1914.

No Drawing.   Application filed November 11, 1912.   Serial No. 730,646.

*To all whom it may concern:*

Be it known that we, CARL BOSCH and ALWIN MITTASCH, subjects, respectively, of the King of Prussia and the King of Saxony, residing at Ludwigshafen-on-the-Rhine, Germany, have invented new and useful Improvements in Producing Ammonia, of which the following is a specification.

The specification of our application for patent Serial No. 650,245 describes the production of ammonia by passing a mixture of nitrogen and hydrogen over heated molybdenum. We have now found that ammonia can also be obtained by passing nitrogen and hydrogen alternately over heated molybdenum, or a nitrogen compound thereof. The nitrogen combines with metallic molybdenum forming a nitrogen compound and the hydrogen reacts with the molybdenum nitrid forming ammonia, and both reactions take place to such a degree and with such rapidity that in this manner the continuous production of ammonia can be carried out on a manufacturing scale. It is preferred to use increased pressure, especially when passing the nitrogen over the mass, and the temperature of working is generally kept below 600° C., although temperatures between 300° and 900° C. can be employed without departing from the nature of our invention. The molybdenum, or nitrogen compound thereof, which is employed, is preferably produced at a low temperature, and, if desired, it can be used in admixture with other suitable compound, or compounds.

In this invention, a nitrogen compound of molybdenum is equivalent to molybdenum.

The following example will serve to illustrate further the nature of our invention, which, however, is not confined to this example: Prepare, in a suitable vessel, molybdenum nitrid by treating molybdic acid, or molybdenum chlorid, with ammonia, and then, at from 500° to 600° C., pass nitrogen and hydrogen alternately through the vessel containing the molybdenum nitrid, while employing pressure. The ammonia formed on passing the hydrogen through the vessel can be isolated in any suitable manner. The nitrogen employed may contain small quantities of hydrogen without departing from the nature of the invention.

Now what we claim is:—

1. The process of producing ammonia by passing nitrogen and hydrogen alternately over a catalyst containing molybdenum and maintained at a temperature between about 300° and 900° C.

2. The process of producing ammonia by passing nitrogen and hydrogen alternately under pressure over a catalyst containing molybdenum and maintained at a temperature between about 300° and 900° C.

3. The process of producing ammonia by passing nitrogen and hydrogen alternately at a pressure above 100 atmospheres over a catalyst containing molybdenum and maintained at a temperature between about 300° and 900° C.

4. The process of producing ammonia by passing practically pure hydrogen and nitrogen containing small quantities of hydrogen alternately over a catalyst containing molybdenum at a temperature of between about 300° and 900° C.

In testimony whereof we have hereunto set our hands in the presence of two subscribing witnesses.

CARL BOSCH.
ALWIN MITTASCH.

Witnesses:
J. ALEC. LLOYD,
JOSEPH PEIFFER.